United States Patent
Garten

(10) Patent No.: US 6,457,913 B1
(45) Date of Patent: Oct. 1, 2002

(54) FOUNDATION FORMING TOOL

(76) Inventor: Dave Garten, 397 Hatton Ct., Roseville, CA (US) 95747

(*) Notice: Subject to any disclaimer, the term of this patent is extended or adjusted under 35 U.S.C. 154(b) by 0 days.

(21) Appl. No.: 09/583,084

(22) Filed: Feb. 22, 1999

Related U.S. Application Data

(63) Continuation-in-part of application No. 08/880,926, filed on Jun. 23, 1997, now abandoned.

(51) Int. Cl.[7] ................................................. E02D 3/02
(52) U.S. Cl. ...................... 405/303; 405/229; 33/451; 33/562; 33/613; 249/34; 249/191
(58) Field of Search ................................ 405/229, 303; 249/34, 191, 193, 36; 52/741.15, 742.14, 745.12, 749.1; 33/451, 375, 518, 562, 523, 613, 645, 384

(56) References Cited

U.S. PATENT DOCUMENTS

| | | | | |
|---|---|---|---|---|
| 2,973,567 A | * | 3/1961 | Brow, Jr. et al. | 249/34 X |
| 3,722,849 A | * | 3/1973 | Luyben | 249/34 X |
| 3,730,476 A | * | 5/1973 | Prichard, Jr. | 249/191 |
| 3,778,020 A | * | 12/1973 | Burrows et al. | 249/34 X |
| 4,257,571 A | * | 3/1981 | Franks | 249/34 X |
| 4,451,993 A | * | 6/1984 | Yauk | 33/451 X |
| 4,625,415 A | * | 12/1986 | Diamontis | 33/562 X |
| 4,989,332 A | * | 2/1991 | Worrallo | 33/451 X |
| 5,129,153 A | * | 7/1992 | Burns, Sr. | 33/613 |
| 5,207,931 A | * | 5/1993 | Porter | 249/34 X |
| 5,249,365 A | * | 10/1993 | Santiago | 33/451 X |
| 5,519,942 A | * | 5/1996 | Webb | 33/451 X |
| 5,617,641 A | * | 4/1997 | Aarhus | 33/374 |
| 5,628,119 A | * | 5/1997 | Bingham et al. | 33/613 |
| 5,884,411 A | * | 3/1999 | Raber | 33/613 |
| 6,134,795 A | * | 10/2000 | Hitchcock | 33/451 |
| 6,279,240 B1 | * | 8/2001 | Bonaventura, Jr. | 33/451 X |
| 6,293,023 B1 | * | 9/2001 | Schooley | 33/375 X |
| 6,293,024 B1 | * | 9/2001 | Fiebig et al. | 33/451 X |

FOREIGN PATENT DOCUMENTS

| | | | | |
|---|---|---|---|---|
| DE | 178257 | * | 4/1986 | 33/384 |
| GB | 2146769 | * | 4/1985 | 33/384 |

\* cited by examiner

*Primary Examiner*—David Bagnell
*Assistant Examiner*—Jong-Suk Lee
(74) *Attorney, Agent, or Firm*—John P. Costello

(57) ABSTRACT

A foundation forming tool is comprised of an upper base and a lower base wherein the upper base is for resting upon the opposing planks comprising a foundation form well, and the lower base extends below the upper base, into the form well, for purposes of precisely and consistently defining the form well's width. The lower base can be made in 6, 8 or 10 inches in length, to conform to standard widths of foundation form wells. Additionally, this forming tool can be made to be telescoping and adjustable between these standard widths, so that one tool could accommodate a variety of forming needs. Finally, this forming tool further comprises a leveling apparatus for allowing a precise horizontal and vertical level to be achieved across a foundation form.

17 Claims, 4 Drawing Sheets

FOUNDATION FORMING TOOL

This application is a Continuation-in-part of Ser. No. 08/880,926, filed Jun. 23, 1997, abandoned.

BACKGROUND OF THE INVENTION

1. Field of the Invention

This invention pertains to a tool for constructing building foundations and more specifically, to a tool for constructing precision foundation forms.

2. Description of the Background Art

Many structures are built upon stone, earth or concrete foundations to provide stability and integrity. Foundations have been incorporated into structures for thousands of years, but in recent times, reinforced concrete has been the material of choice for building foundations. Prior to pouring the concrete, the reinforcing material, which is usually steel "rebar" is laid, and a form is built around the rebar. The foundation form creates a type of surrounding well, into which the concrete is poured, which allows the concrete to retain its shape, until it dries. Upon drying, the foundation is usually in an elongate, squared or rectangular shape, and the remainder of the structure is built on top of this foundation.

It is crucial for a foundation to have a precisely squared, or rectangular shape wherein the top surface is precisely level so that any structure built thereon will be as true as possible. In order to obtain such precise foundations, the forms have to be built with precision. Typically, the accepted method of building forms has required the craftsman or "former" to use a variety of tools; namely levels, building squares, and tape measures. The tape measure was used to achieve a preferred width for the form well, upon which the well was built, using planks to, construct opposing sidewalls. The square was used to make sure that the sidewalls were vertically straight, upon which stakes were driven next to the sidewalls to retain them in a straight vertical position. Finally, the level was used to make sure that the top surfaces of the opposing sidewalls were level at a desired height, so that when the concrete was poured the foundation would have a desired depth and not over-pour one side of the form. The use of these multiple tools to achieve a precise foundation has allowed precise foundations to be built in the past. However, a drawback exists in that the craftsman must carry these three tools around a building site, which becomes cumbersome. Additionally, the use of three tools also opens the construction process up to numerous miscalculations, especially if imprecise measurements are made, requiring the former to later correct his mistakes.

Therefore, a need exists for a single specialty tool precisely designed for constructing foundation forms. This tool would preferably incorporate the features of a measuring tool, a building square, and a level, all in one. Additionally, this tool would preferably provide uniform measuring and leveling so that miscalculations in measuring and leveling could be avoided, thereby allowing extremely precise foundation forms to be built.

Accordingly, the foregoing information reflects the state of the art of which the inventor is aware, and is tendered with a view toward discharging the inventor's acknowledged duty of candor in disclosing information which may be pertinent with regards to the patentability of the present invention. It is respectfully stipulated, however, that the disclosed information does not teach or render obvious, singly or when considered in combination, the inventor's claimed invention.

SUMMARY OF THE INVENTION

By way of example, and not of limitation, the present invention generally pertains to a foundation forming tool which incorporates measuring, leveling and squaring capabilities. In the preferred embodiment, this invention is comprised of a lower base which evolves into an upper base. The lower base is of a length approximating the preferred width of a foundation and terminates in two opposing, squared-off, ends. The squared off ends of the lower base are intended to provide a surface for allowing the opposing sidewalls of a foundation form to flushly abut against. In this manner, a precise and uniform foundation width is achieved by this tool.

The upper base is of a greater length than the lower base and the upper base overhangs the squared-off ends of the lower base, by a significant margin. These "overhangs" are intended to contact the top of the opposing sidewalls while the lower base hangs down into the foundation form well. The overhangs are positioned in a preferred 90 degree relation to the squared-off ends. This 90 degree relation allows the opposing planks which comprise a form well to be precisely squared in relation to each other, thereby insuring that the planks will be vertically straight prior to staking them in place.

Finally, a leveling means, such as a common bubble leveler is positioned in this tool for allowing a level foundation form to be built. The leveling means preferably has the capability to indicate horizontal and vertical levels, the same as many leveling tools already in existence. Hence, precise width measurement is achieved by the lower base; precise squaring is achieved by the 90 degree junction of the upper and lower bases; and precise horizontal and vertical leveling is achieve by the leveling means. Also, the invention could incorporate a laser device for accomplishing a variety of tasks, such as shooting level lines to various locations around a foundation form or building site.

Accordingly, this invention will be more fully understood through the following objects and advantages:

An object of the invention is to provide a foundation forming tool which incorporates measuring, squaring, and leveling features in a single tool.

Another object of the invention is to provide a foundation forming tool capable of creating uniformly precise foundations.

Further objects and advantages of the invention will be brought out in the following portions of the specification, wherein the detailed description is for the purpose of fully disclosing preferred embodiments of the invention, without placing limitations thereon.

BRIEF DESCRIPTION OF THE DRAWINGS

The invention will be more fully understood by reference to the following drawings which are for illustrative purposes only.

DESCRIPTION OF THE PREFERRED EMBODIMENTS

Figure 1:
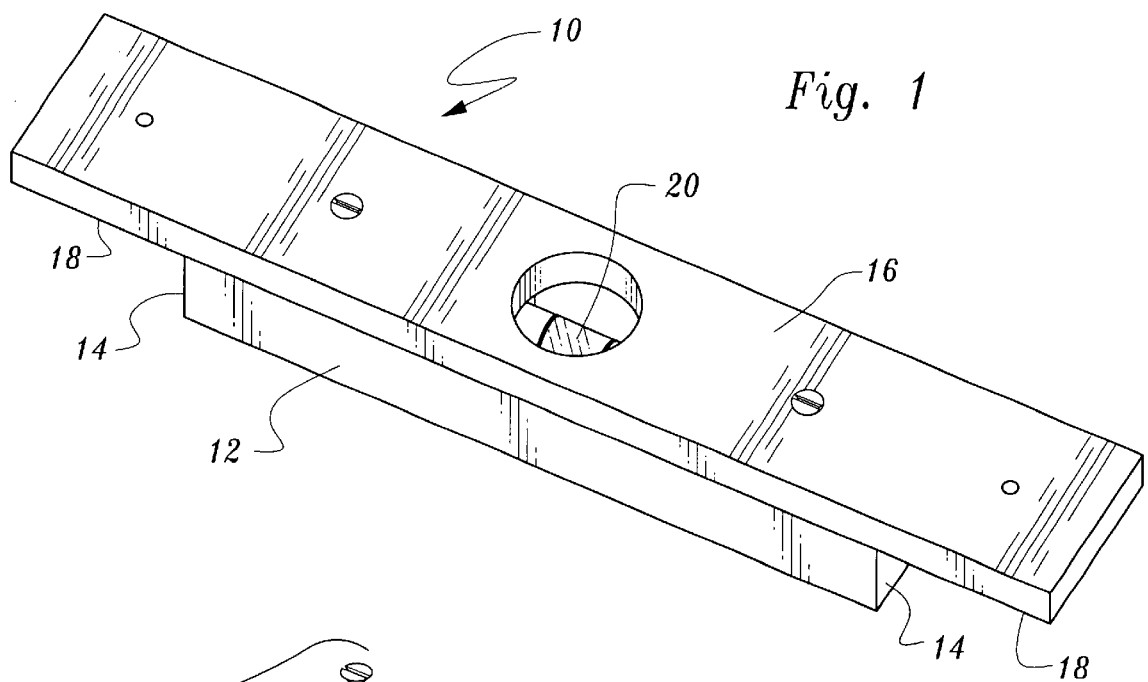
FIG. 1 is a perspective view of a first embodiment of the foundation forming tool which is the present invention.
Figure 8:
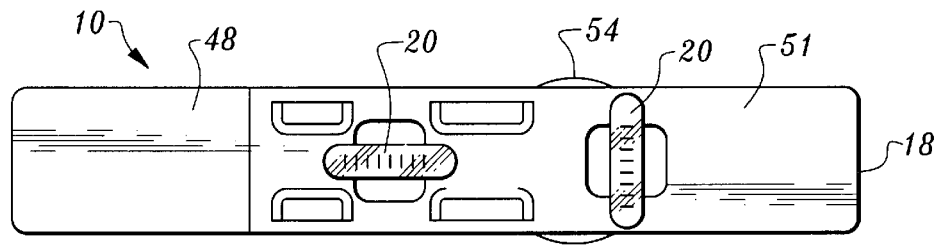
FIG. 8 is a plan view of the alternate telescoping embodiment shown in FIG. 6.
Figure 9:
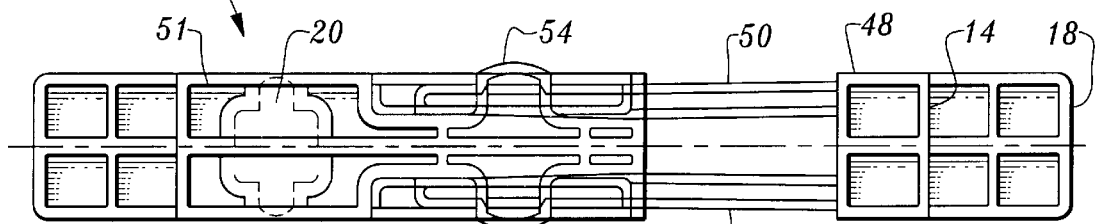
FIG. 9 is a bottom view of the alternate telescoping embodiment shown in FIG. 7.

Referring more specifically to the drawings, the foundation forming tool which is the present invention, is shown generally in FIG. 1. Forming tool 10 is comprised of a lower base 12 having a generally rectangular configuration with opposing ends 14, which are preferably squared-off for flushly contacting the sides of a foundation form well. Upper base 16 sits atop lower base 12, and must be of a greater length than lower base, such that two overlapping edges 18 are oriented in a 90 degree relation to ends 14. Upper 16 and lower 12 bases are preferably of the same width, such that the width of overlapping edges 18 and ends 14 are approximately the same. Positioned within foundation forming, tool 10 is a leveling means 20 which can be a common bubble leveler, for example. Horizontal leveling means 20 is preferably centrally located within a cavity 22 in foundation forming tool and is made to be removable and replaceable should breakage of leveling means 20 occur. Likewise as shown in FIG. 8 a vertical leveling means 21 is incorporated into the device for purposes of allowing the vertical level of the sides of foundation forms to be determined.

Figure 2:
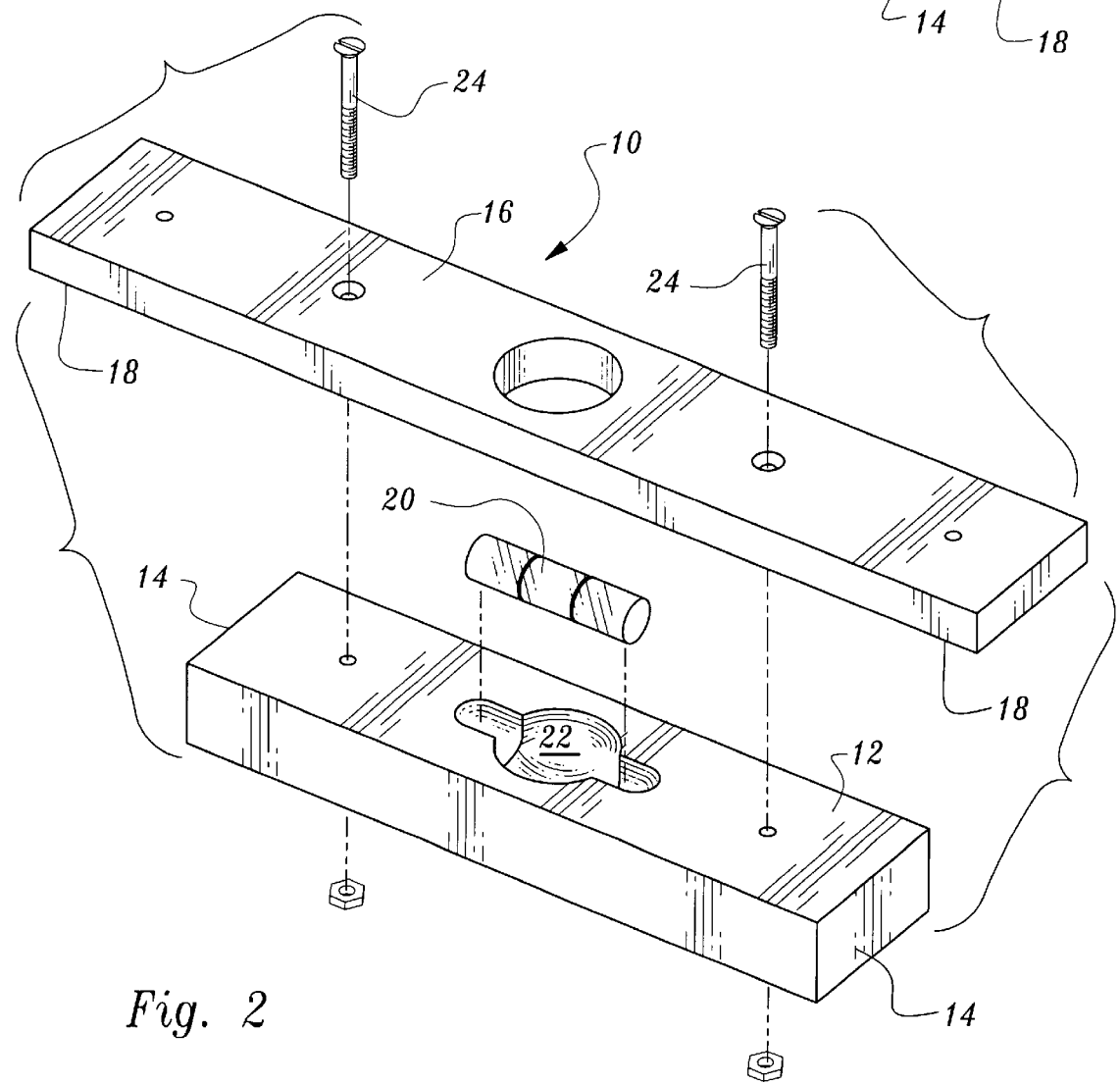
FIG. 2 is an exploded view of the first embodiment of the present invention, illustrating its various components.

In FIG. 2, an exploded view of a first, two-piece embodiment of foundation forming tool 10, is shown. In this view, upper base 16 is separable from lower base 12, with leveling means 20 being encased in cavity 22 upon coupling upper and lower base together with screws 24. This embodiment allows for leveling means 20 to be cheaply made and easily replaced upon breaking. Likewise, in a second embodiment, shown in FIG. 3, it would be possible to mold upper 16 and lower 12 bases together as a single piece, having a cavity 26 for placing leveling means 20 and a mounting bracket 28 for keeping leveling means 20 protected within cavity 26.

Figure 4:
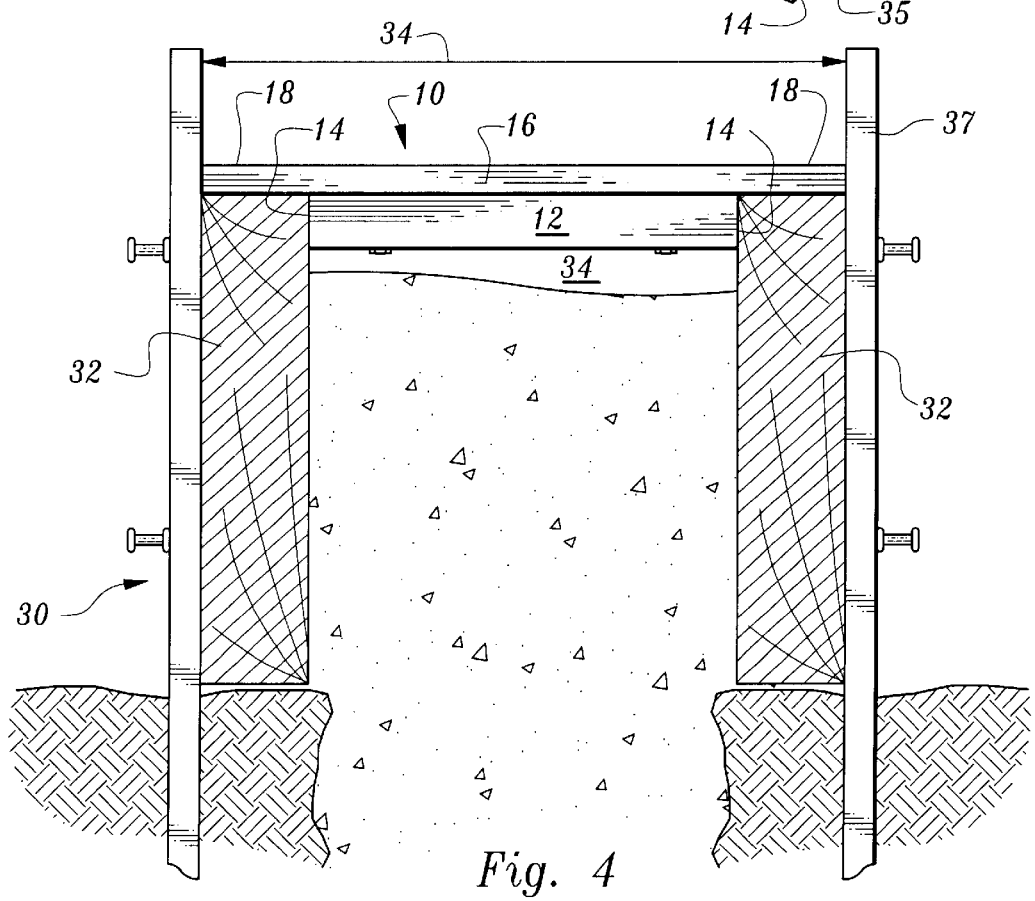
FIG. 4 is a frontal view of the present invention positioned in a cutaway of a foundation form.

FIG. 4 illustrates the method for using foundation forming tool 10. As shown, foundation form 30 is created by placing planks 32 in a lengthwise and opposing relation, wherein forming tool 10 allows precise placement of planks 32 for purposes of achieving consistent, high-quality forms. Ends 14 abut in a flush manner against the sides of planks 32, thereby allowing a consistent width measurement of the form well 34 between planks 32, to occur. For example, typically, foundations for one-story buildings must be 6" wide and foundations for two-story buildings must be 8" wide. Hence, if it is desired to have a 6" or an 8" wide foundation, then lower base 12 can be constructed to have a 6" or an 8" length.

Figure 3:
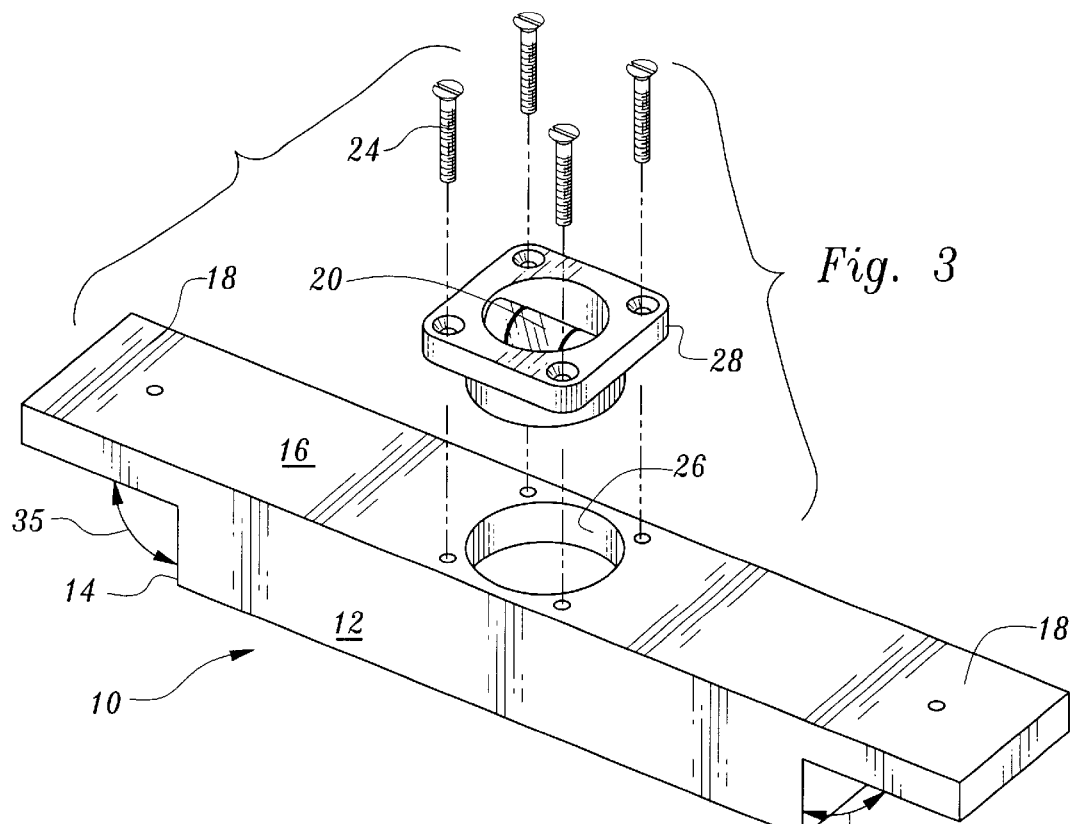
FIG. 3 is an exploded view of a second alternate embodiment of the present invention.

As seen in FIGS. 3 and 4, upper base 16 rests upon the tops of planks 32 via overlapping edges 18, these overlapping edges providing a rest for allowing lower base 12 to extend into, and span across, foundation form well 34. A 90 degree angle 35 is formed at the junction of upper and lower bases, this angle allowing planks 32 to be precisely squared therein. Additionally, upper base 16 allows foundation forming tool 10 to be positioned upon planks 32 for horizontally leveling them to a desired height. For example, if it is desired to have a foundation 12" high, then two 6" wide planks could be stacked, per side, and horizontally and vertically leveled with foundation forming tool, so that a consistent, 12" high foundation could be formed.

Once a desired width and level of foundation form well 34 is created, using foundation forming tool, then planks 32 are staked 37, into place. Following staking, foundation forming tool 10 can be used to re-check foundation form well 34 with regard to the parameters of width and level. The foundation can then be poured. If "rebar" or similar reinforcing material is used for making a foundation, the method of using foundation forming tool 10 would be unaltered from the method just described.

Figure 5:
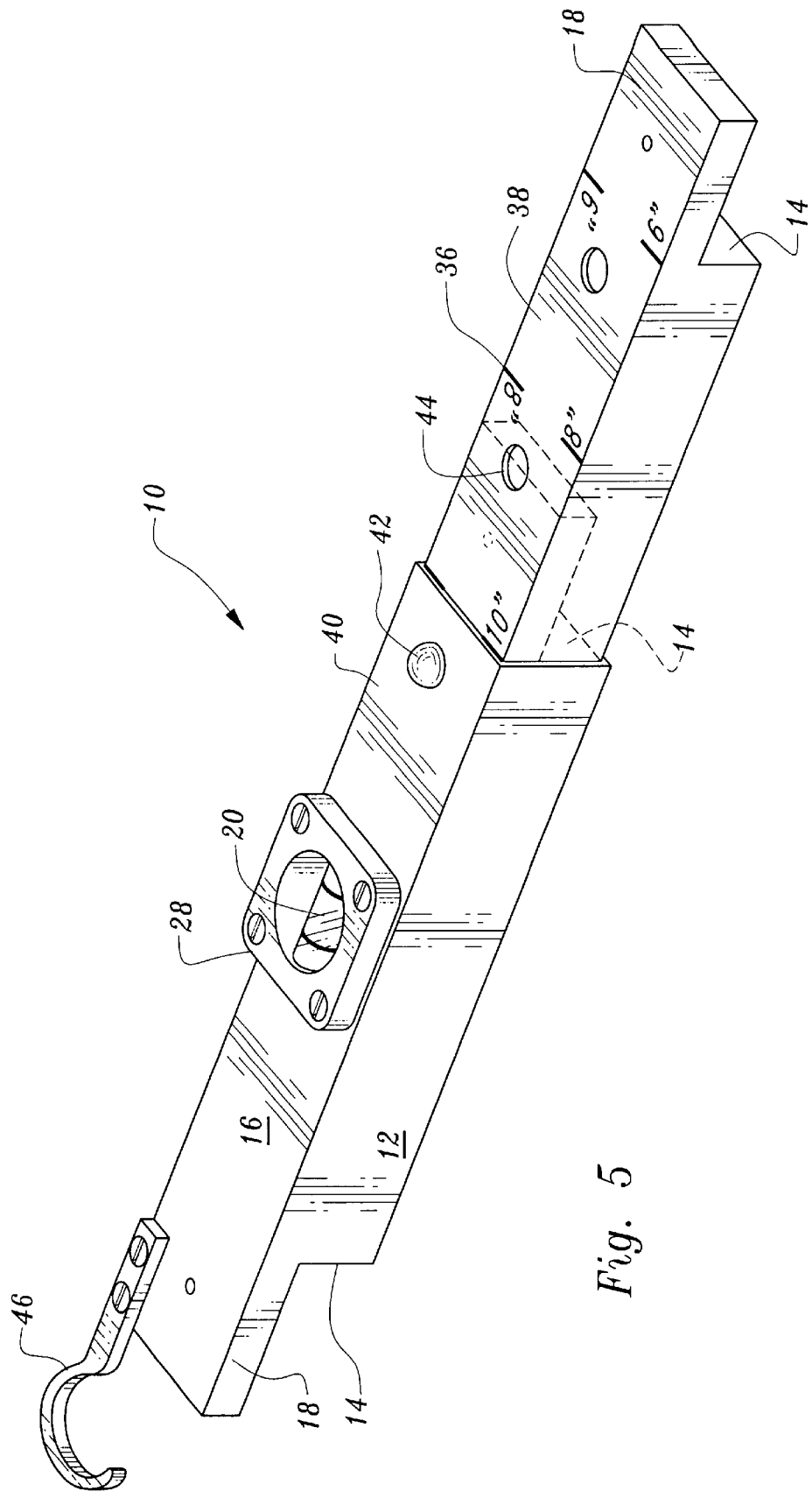
FIG. 5 is a perspective view of a third alternate embodiment of the foundation forming tool having a telescoping means for allowing the forming tool to be adjusted between differing foundation widths.
Figure 6:
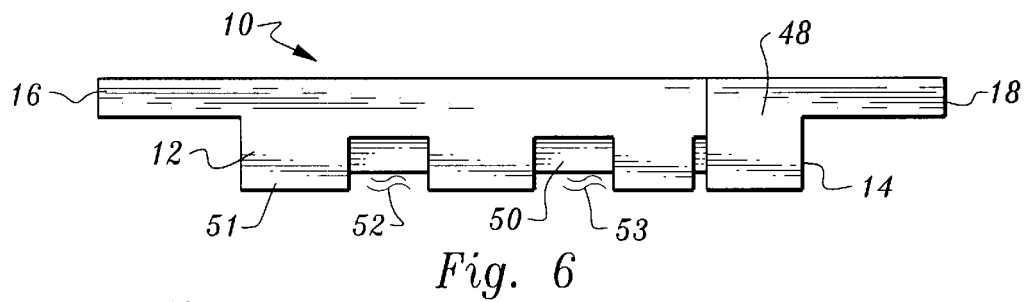
FIG. 6 is a side view of an alternate telescoping embodiment of the invention, shown fully retracted.
Figure 7:
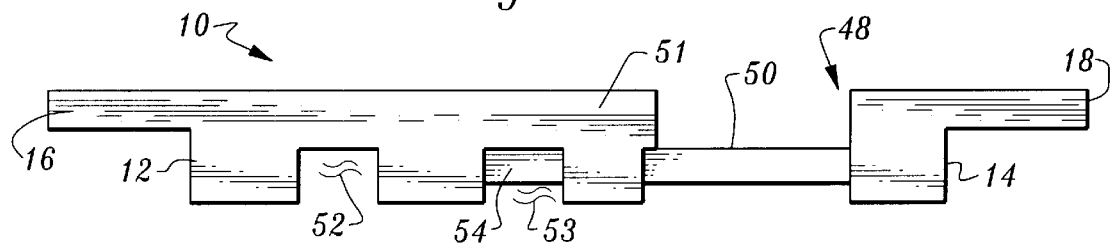
FIG. 7 is a side view of the alternate telescoping embodiment illustrated in FIG. 6, shown fully extended.

Foundation forming tool 10 can also be modified in additional ways for purposes of increasing its utility. By way of example and not of limitation, a third, adjustable embodiment having a telescoping feature, is shown in FIG. 5. This embodiment allows one forming tool 10 to be selectively adapted for building foundations with a variety of widths. Graduations 36 denoting common foundation widths, such as 6", 8", and 10" would be placed at a visible location to allow the tool 10 to be telescoped as needed. Telescoping could be accomplished by having a first half 38 of forming tool 10 slide within a second half 40. A depressible detente ball 42 could be pressed in and out of stop holes 44, which would correspond to the 6", 8" and 10" graduations 36, thereby allowing a former to select and adjust forming tool 10 to a preferred foundation width. This embodiment would require a former to carry only one forming tool to accommodate a number of sizes of foundations. Finally, for easy carrying on a tool belt, foundation forming tool could have an attachment hook 46, or similar attachment means as shown in FIG. 5.

FIGS. 6–9 illustrate a fourth, lightweight, telescoping embodiment of tool 10. The basic configuration of an upper base 16 and a lower base 12 is retained, along with overlapping edges 18. However, instead of a detente ball arrangement to telescope tool 10, a lightweight slide arm 48 having arms 50 for engaging with the body 51 of the forming tool 10 at measured locations 52, 53 provides the telescoping feature. Arms 50 are depressible at engaging members 54 which allow the placement of an index finger and thumb. Merely pressing inward upon engaging members 54 causes arms to depress inward, thereby freeing slide arm 48 to move from a first location 52 to a second location 53. Locations 52, 53 may represent 6" and 8" widths, for example. Upon reaching a desired width/location, engaging members 54 interlock with body 51. Slide arm 48 results in a significant reduction in the amount of material required to build tool 10. Materials such as high-impact plastics or lightweight carbon fibers would be preferred for building an exceptionally lightweight foundation forming tool.

Figure 10:
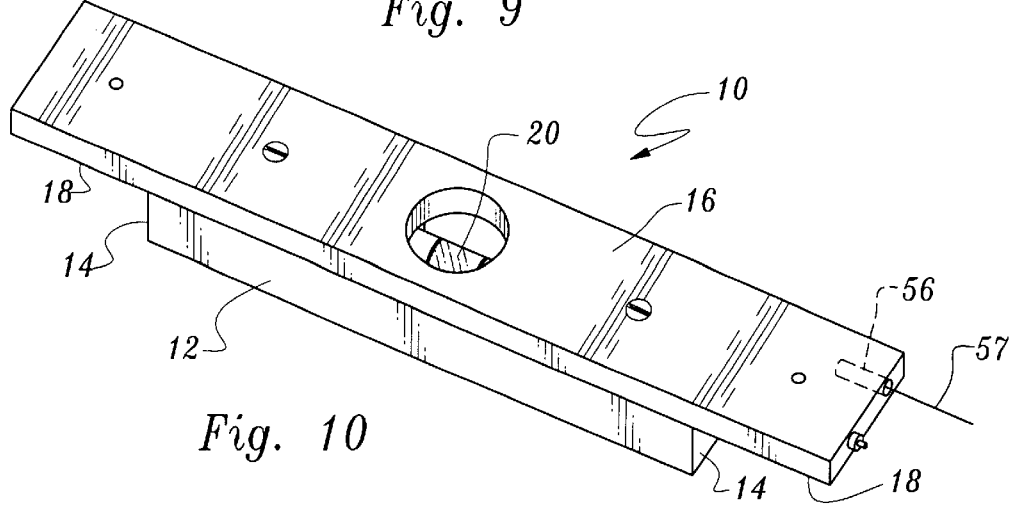
FIG. 10 is a perspective view of the preferred embodiment shown incorporating a laser device.

FIG. 10 illustrates a foundation forming tool 10 incorporating a laser device 56. Many such laser devices are now common in leveling tools. In the context of the present tool, a laser device would allow laser beams 57 to be shot to various points along a foundation form to determine uniformity of height along the form, for example. Such a laser device 56 could be incorporated in all embodiments described herein, and could be put to many other uses in a general construction context.

Finally, although the description above contains many specificities, these should not be construed as limiting the scope of the invention, but as merely providing illustrations of some of the presently preferred embodiments of this invention. Thus the scope of this invention should be determined by the appended claims and their legal equivalents.

I claim:

1. A foundation forming tool comprising:
   a) a lower base, said lower base further comprising opposing ends, said lower base having a length between said opposing ends defining the width of a foundation form well, said opposing ends flushly contacting both opposing sides of said foundation form well, said lower base evolving into an upper base, said upper base further comprising edges extending a length beyond said opposing ends, said edges overhanging said opposing ends, said edges having bottoms contracting a top surface of said foundation form well; and
   b) leveling means for leveling said forming tool upon positioning said forming tool in said foundation form well.

2. The foundation forming tool of claim 1, wherein said upper and lower bases are separable.

3. The foundation forming tool of claim 1, wherein said upper and lower bases comprise a single piece.

4. The foundation forming tool of claim 1, further comprising telescoping means for adjusting said forming tool between a plurality of preferred foundation widths.

5. The foundation forming tool of claim 1, further comprising a laser device.

6. The foundation forming tool of claim 1, wherein said leveling means determines both horizontal and vertical level points.

7. A foundation forming tool comprising:
   a) a lower base, said lower base further comprising opposing squared-off ends, said lower base having a length between said opposing squared-off ends defining the width of a foundation form well, said squared-off ends flushly contacting both opposing sides of said foundation form well, said lower base evolving into an upper base, said upper base further comprising edges extending a length beyond said squared off ends, said edges overhanging said squared off ends, said edges having bottoms contacting a top surface of said foundation form well; and
   b) leveling means for leveling said forming tool upon positioning said forming tool in said foundation form well.

8. The foundation forming tool of claim 7, wherein said upper and lower bases are separable.

9. The foundation forming tool of claim 7, wherein said upper and lower bases comprise a single piece.

10. The foundation forming tool of claim 7, further comprising telescoping means for adjusting said forming tool between a plurality of preferred foundation widths.

11. The foundation forming tool of claim 7, further comprising a laser device.

12. The foundation forming tool of claim 7, wherein said leveling means determines both horizontal and vertical level points.

13. A foundation forming tool comprising:
   a) a lower base, said lower base further comprising opposing squared-off ends, said lower base having a length between said opposing squared-off ends defining the width of a foundation form well, said squared-off ends flushly contacting both opposing sides of said foundation form well, said lower base evolving into an upper base, said upper base further comprising edges extending a length beyond said squared-off ends, said edges overhanging said squared-off ends, said edges having bottoms contacting a top surface of said foundation form well;
   b) a telescoping mechanism for telescoping said upper and lower base between a plurality of foundation form well widths; and
   c) leveling means for checking level points along said foundation form well upon positioning said forming tool in said foundation form well.

14. The foundation forming tool of claim 13, wherein said telescoping mechanism is a detente ball mechanism.

15. The foundation forming tool of claim 13, wherein said telescoping mechanism is a lightweight slide arm having engaging members interlocking with the body of said tool at selected locations, said locations defining a plurality of form well widths.

16. The foundation forming tool of claim 13, further comprising a laser device.

17. The foundation forming tool of claim 13, wherein said leveling means determines both horizontal and vertical level points.

* * * * *